US006497308B2

(12) United States Patent  
Lisenker

(10) Patent No.: US 6,497,308 B2
(45) Date of Patent: Dec. 24, 2002

(54) MAGNETO-RHEOLOGICAL FLUID DAMPER PISTON-FLUX RING ATTACHMENT

(75) Inventor: Ilya Lisenker, Miamisburg, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/808,544

(22) Filed: Mar. 14, 2001

(65) Prior Publication Data

US 2002/0130001 A1 Sep. 19, 2002

(51) Int. Cl.[7] .................................................. F16F 9/53
(52) U.S. Cl. .................................................... 188/267.2
(58) Field of Search ............................ 188/26.7, 267.1, 188/267.2

(56) References Cited

U.S. PATENT DOCUMENTS

| | | | | |
|---|---|---|---|---|
| 5,014,829 A | * | 5/1991 | Hare | 188/267 |
| 5,277,281 A | | 1/1994 | Carlson et al. | |
| 5,284,330 A | * | 2/1994 | Carlson et al. | 267/140.14 |
| 5,398,917 A | * | 3/1995 | Carlson et al. | 267/140.14 |
| 5,678,808 A | | 10/1997 | Claude et al. | |
| 5,878,851 A | | 3/1999 | Carlson et al. | |
| 5,984,060 A | | 11/1999 | Clark et al. | |
| 6,019,201 A | * | 2/2000 | Gordaninejad et al. | 188/267.1 |
| 6,095,486 A | * | 8/2000 | Ivers et al. | 188/267 |
| 6,202,806 B1 | * | 3/2001 | Sandrin et al. | 188/267.1 |
| 6,260,675 B1 | * | 7/2001 | Muhlenkamp | 188/267 |
| 6,279,700 B1 | * | 8/2001 | Lisenker et al. | 188/267.1 |
| 6,279,701 B1 | * | 8/2001 | Namuduri et al. | 188/267.2 |
| 6,311,810 B1 | * | 11/2001 | Hopkins et al. | 188/267.2 |

FOREIGN PATENT DOCUMENTS

WO    WO 98/00653    1/1998

* cited by examiner

Primary Examiner—Christopher P. Schwartz
Assistant Examiner—Devon Kramer
(74) Attorney, Agent, or Firm—Scott A. McBain

(57) ABSTRACT

A piston assembly for use with an MR fluid damper. The piston assembly has a piston core and a flux ring positioned in a desired alignment with the piston core so that the flux ring forms an annular flow gap the piston core. The flux ring is secured to the piston core in the desired alignment by a plurality of projections extending across the flow gap between an inner surface of the flux ring and an outer surface of the piston core. The projections are molded through flux ring holes intersecting the inner and outer surfaces of the flux ring. A method for making the piston assembly is also described and claimed.

19 Claims, 2 Drawing Sheets

MAGNETO-RHEOLOGICAL FLUID DAMPER PISTON-FLUX RING ATTACHMENT

FIELD OF THE INVENTION

The present invention relates to a magneto-rheological ("MR") fluid damper, and more particularly, to a linearly-acting MR fluid damper suitable for vibration damping in a vehicle suspension system.

BACKGROUND OF THE INVENTION

MR fluids are materials that respond to an applied magnetic field with a change in Theological behavior (i.e., change in formation and material flow characteristics). The flow characteristics of these non-Newtonian MR fluids change several orders of magnitude within milliseconds when subjected to a suitable magnetic field. In particular, magnetic particles noncolloidally suspended in fluid align in chain-like structures parallel to the applied magnetic field, changing the shear stress on adjacent shear surfaces.

Devices such as controllable dampers benefit from the controllable shear stress of MR fluid. For example, linearly-acting MR fluid dampers are used in vehicle suspension systems as vibration dampers. At low levels of vehicle vibration, the MR fluid damper lightly damps the vibration, providing a more comfortable ride, by applying a low magnetic field or no magnetic field at all to the MR fluid. At high levels of vehicle vibration, the amount of damping can be selectively increased by applying a stronger magnetic field. The controllable damper lends itself to integration in vehicle suspension systems that respond to vehicle load, road surface condition, and driver preference by adjusting the suspension performance.

In some applications, linearly-acting MR fluid dampers use a piston assembly that moves within a damper body tube having a cylindrical reservoir that separates a volume of MR fluid into a compression chamber and an extension chamber. The piston assembly has a piston core positioned within a flux ring to form an annular flow gap therebetween. Relative motion between the damper body tube and the piston assembly is dampened by a flow of the MR fluid through the flow gap from one chamber to another caused by the relative motion.

Alignment of the flux ring is critical for optimum performance. Ideally, the piston assembly should move freely within the reservoir in the damper body tube without friction or binding. In addition, the radial width and concentricity of the annular flow passage must be precisely set and maintained along the axial length of the passage throughout the operation to ensure optimum, predictable control of the damping. Consequently, the flux ring must be correctly aligned with the piston core.

Attachment elements have been suggested to provide flux ring alignment with nonmagnetic bridge elements. In particular, perforated end plates are aligned above and below the flux ring and piston core. These attachment elements have several potential problems. First, the attachment elements increase the length of the piston assembly. Consequently, less travel distance is available for the piston to move within the cylindrical reservoir of the damper body tube. Second, the attachment elements require tight manufacturing tolerances in order to correctly align the flux ring to the piston core. Third, such attachment elements often include tabs or other projections that increase the drag as the piston moves, which may be undesirable. Fourth, the attachment elements have numerous components and require manufacturing operations such as spot welding. Therefore, such attachment elements are costly to manufacture and time consuming to assemble.

Consequently, there is a need for an improved piston assembly suitable for use in a magneto-rheological (MR) fluid damper.

SUMMARY OF THE INVENTION

The present invention addresses the above need by providing an improved piston assembly for a linearly-acting MR fluid damper. The piston assembly of the present invention confines a flux ring within the functional length of the piston assembly without significantly restricting fluid flow, thereby providing optimum performance with minimal piston length. Further, the part count of the piston assembly is reduced; and the piston assembly is easier to assemble in a desired alignment. Thus, the piston assembly of the present invention is of a simpler construction than known damper pistons that can be manufactured for less cost.

According to the principles of the present invention and in accordance with the described embodiment, the present invention provides a piston assembly for use with an MR fluid damper. The piston assembly has a flux ring positioned in a desired alignment with a piston core to form an annular flow gap between the flux ring and the piston core. The piston core is secured to the flux ring in the desired alignment by a plurality of projections extending across the flow gap between an inner surface of the flux ring and an outer surface of the piston core. Thus, the flux ring is secured on the piston ring without using expensive, high precision attachment components; and the piston assembly is able to utilize its full length, thereby providing optimum performance with a minimum of length piston.

In one aspect of the present invention, the projections are molded through attachment passages in the flux ring. In a further aspect of the invention, the attachment passages are holes intersecting the inner and outer surfaces of the flux ring.

In another embodiment of the invention, a method is provided for making a piston assembly for use with an MR fluid damper. The method comprises first, fixing a piston core and a flux ring in a desired alignment forming a flow gap therebetween; and then, forming a plurality of projections in the flow gap between the flux ring and the piston core to secure the flux ring on the piston core in a desired alignment.

These and other objects and advantages of the present invention will become more readily apparent during the following detailed description taken in conjunction with the drawings herein.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION OF THE INVENTION

Figure 1:
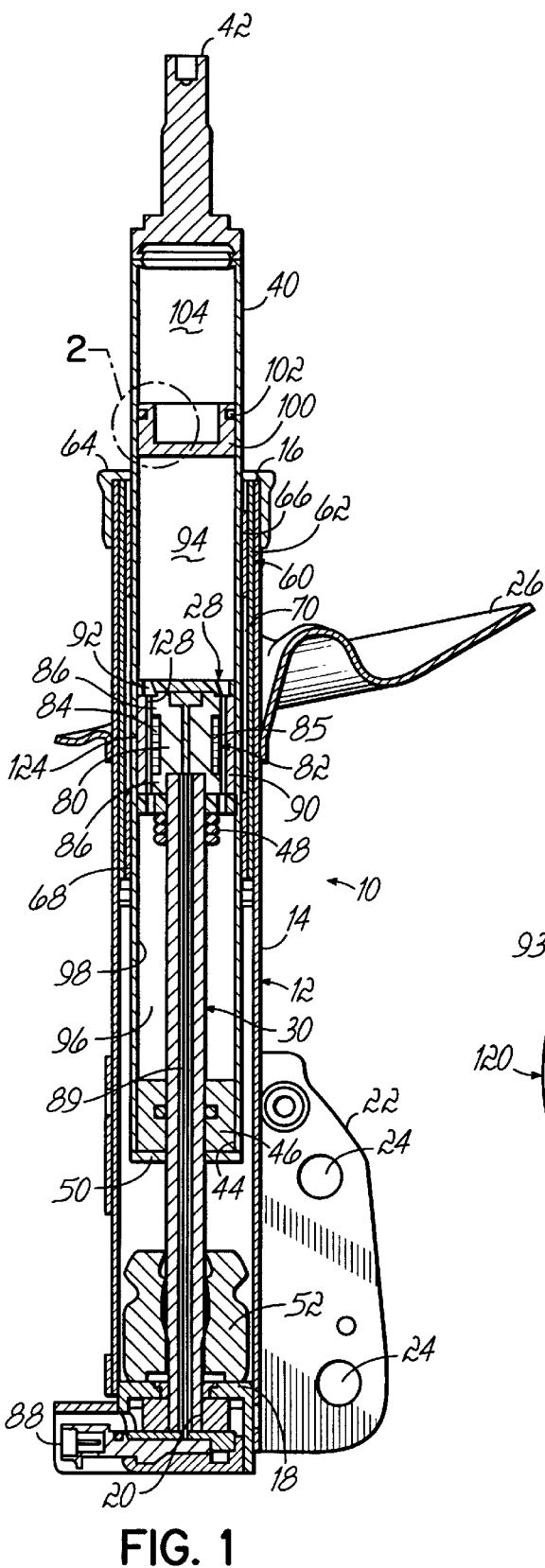
FIG. 1 is a cross-sectional view of a magneto-rheological (MR) fluid damper.

FIG. 1 illustrates a linearly-acting MR fluid damper, in particular a monotube gas-charged suspension strut 10. In general, the strut 10 is designed for operation as a load-bearing and shock-absorbing device within a vehicle suspension system, and is connected between the sprung (body) and unsprung (wheel assembly) masses (not shown). The strut 10 comprises a housing 12 that includes a housing tube 14 with an open end 16 and a closed end 18. The closed end 18 includes an opening 20. A mounting bracket 22 near closed end 18 is secured in position by a suitable means such as welding. The mounting bracket 22 has suitable openings 24 for connection to the unsprung mass of the vehicle at a location such as the steering knuckle (not illustrated). A spring seat 26 is also received on the housing tube 14 and is positioned as required by the particular application within which the strut 10 will operate. The spring seat 26 is fixed in position on the housing tube 14 by a suitable means such as welding.

A piston assembly 28 consistent with aspects of the invention is connected to a hollow piston rod 30 and is fixed in position within the housing tube 14. The piston rod 30 extends through the opening 20.

The strut 10 further includes a damper body tube 40 that is slidingly received over the piston assembly 28. The damper body tube 40 includes a first end 42 at an outboard position adapted to be connected to the sprung mass of the vehicle and includes a second end 44 at an inboard position. The second end 44 is supported about the piston rod 30 by a rod guide assembly 46 that is fixed in position within the damper body tube 40. At maximum extension of the strut 10, a rebound bumper 48 on the bottom of the piston assembly 28 is compressed against the rod guide assembly 46 to cushion the deceleration of strut 10. At maximum compression of the strut 10, a bottom plate 50 at the second end 44 of damper body tube 40 contacts a jounce bumper 52 that comprises an elastomeric bushing that is positioned against the closed end 18 of housing tube 14 and about the piston rod 30.

The predominant means of supporting the damper body tube 40 within the housing tube 14 is provided by a bearing system 60. The bearing system 60 includes a bearing sleeve 62 slip-fit into the open end 16 of the housing tube 14. The bearing sleeve 62 is maintained in position by a retaining cap 64 that is threaded onto the open end 16 of housing tube 14. The bearing assembly 60 also includes a pair of plain bearings 66, 68 that are pressed into the bearing sleeve 62 and bear against the damper body tube 40. A fluid-tight chamber 70 filled with a lubricating oil is maintained between the bearings 66, 68 with seals (not shown).

Alternatively, the bearing sleeve 62 may be crimped onto the bearing assembly 60 with the retaining cap 64 used to keep out dirt.

The piston assembly 28 includes a piston core 80 formed of a magnetic material and having opposed flux pole pieces 86 on each end. The piston assembly 28 is mounted on the end of a piston rod 30. The piston assembly 28 further includes a magnet assembly 82 having a coil 84 mounted on piston core 80 between the flux pole pieces 86. The coil 84 is connected to an electrical source (not shown) via an electrical connector 88. Wires 89 extend from the connector 88, through the piston rod 30 to the coil 84.

The magnet assembly 82 also includes an annular flux ring 90 positioned around piston core 80 to form an annular flow gap 92 between the inner cylindrical surface 128 of the flux ring 90 and the outer surface 93 of piston core 80 and coil 84. The piston assembly 28 divides the volume of MR fluid within the damper body tube 40 into a compression chamber 94 and an extension chamber 96.

During damping, magneto-rheological (MR) fluid present in the chambers 94, 96 of the damper body tube 40 flows through flow gap 92 from, for example, extension chamber 96 to compression chamber 94, as the damper body tube 40 moves upward. The cylindrical outer surface 124 of the flux ring 90 forms a sliding fluid seal with an inner surface 98 of damper body tube 14, and thus, the damper body tube 14 can slide relative to the outer surface of the flux ring 90 without significant leakage therebetween.

The MR fluid within damper body tube 40 may be any conventional fluid including magnetic particles such as iron or iron alloys which can be controllably suspended within the fluid by controlling a magnetic field, thereby varying the flow characteristics of the MR fluid through the flow gap 92. The electrical current to coil 84 is varied to vary the magnetic field, thereby controlling the flow characteristics of the MR fluid to achieve a desired damping effect between the sprung and unsprung masses of the vehicle for a given application.

A gas cup 100 is also carried in the damper body tube 40 between the piston assembly and the end. The gas cup 100 carries a dynamic seal 102 and slides along the inner surface 98 of damper body tube 40, separating compensation chamber 104 from the compression chamber 94. While the extension chamber 96 and compression chamber 94 carry a supply of MR fluid, the compensation chamber 104 carries a compressible nitrogen gas supply. During extension and compression directed travel of the damper body tube 40 relative to the piston assembly 28, a decreasing or an increasing volume of the piston rod 30 is contained within the damper body tube 40 depending on the stroke position of the strut 10. In order to compensate for this varying volumetric amount of the piston rod 30 within the fluid-filled chambers 94, 96, the gas cup 100 slides, compressing or expanding the compensation chamber 104.

Figure 2:
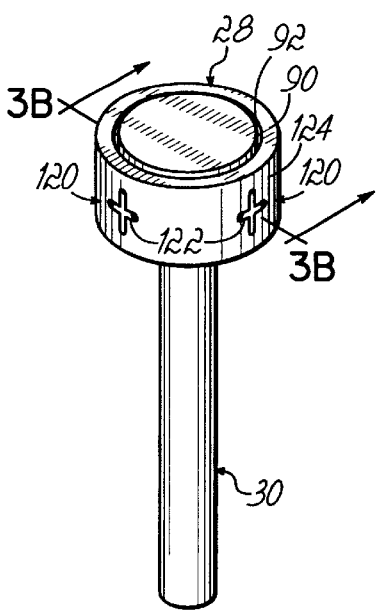
FIG. 2 is a perspective view of a piston assembly in accordance with the principles of the present invention for the MR fluid damper of FIG. 1.
Figure 3A:
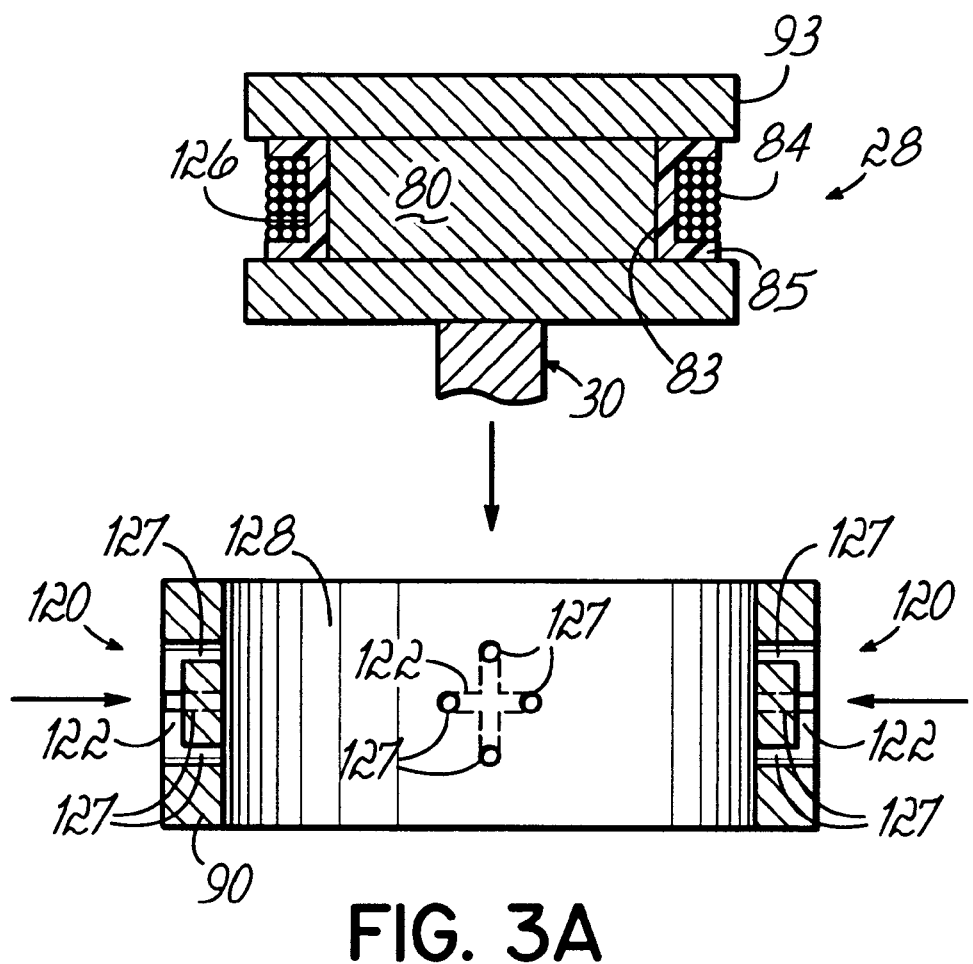
FIG. 3A is an exploded cross-sectional view of the piston assembly of FIG. 2 along lines 3B—3B.

One feature of present invention is the concentric mounting of the flux ring 90 on the piston core 80 to form the piston assembly 28 of the strut 10 of FIG. 1. Referring to FIGS. 2 and 3A, the annular flux ring 90 has a plurality of attachment passages 120 spaced about and disposed in a circumferential outer surface 124 of the flux ring 90. In the illustrated example, the attachment passages 120 are cross-shaped with perpendicular legs formed by slots or grooves 122 disposed in the outer surface 124 of the flux ring 90. The outer end of each slot terminates with a through hole 127 that intersects the respective slot and the inner surface 128 of the annular flux ring 90.

FIG. 3A also depicts the piston core 80 in more detail. The piston core 80 is made of magnetic material with an annular recess 83 in its outer surface 93. An electrical insulating over-molding 85 is molded in the recess 83 to form another recess 126. The coil 84 is then formed by winding coil wire in the recess 126.

Figure 4:
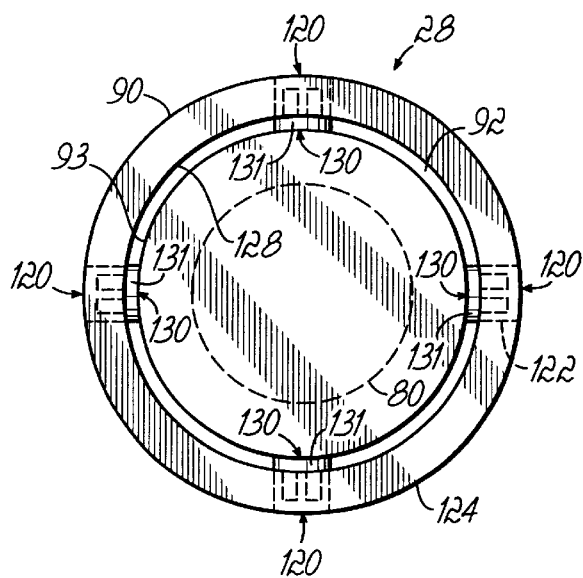
FIG. 4 is a top view of the piston assembly of FIG. 2.
Figure 3B:
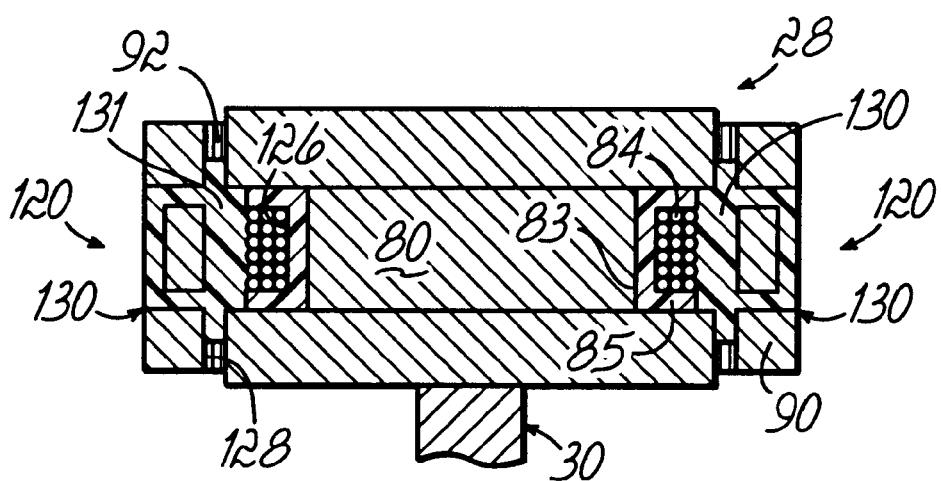
FIG. 3B is a cross-sectional view of the piston assembly of FIG. 2 along lines 3B—3B.

Referring to FIG. 3B, the flux ring 90 is secured to the piston core 80 by a molding process. First, the assembly of the piston core 80, over-molding 85 and coil 84 is fixed in a concentric relationship within the annular flux ring 90 inside an injection mold (not shown). Next, a polymer or plastic is injected into the attachment passages 120. Referring to FIG. 4, an appropriate amount of polymer is injected so that pylons 130 are formed that extend through the holes 127, bridge the flow gap 92, extend into the recess 126 and terminate against the outer surface of the coil 84 and over-molding 85. Thus, the radial projections 131 of the pylons 130 that bridge the flow gap 92 between the flux ring 90 and the piston core 80 maintain and secure the annular flux ring 90 in its desired concentric relationship with the piston core 84 while leaving a significant portion of the flow gap 92 open for MR fluid flow. Plastic that flows in the grooves 122 connects with the projections 131, so that when the plastic cools, it shrinks and effectively preloads itself. The preloading tightens the plastic around the flux ring 90, thereby maintaining it in a tight assembly with the piston core 80.

As is appreciated by those who are skilled in the art, the attachment passages 120 can have various dimensions and patterns of grooves and/or holes. In particular, the pattern of holes 127 may advantageously be chosen to form a pylon 130 with a low drag, "airfoil" shape to enhance performance.

Further, in some applications, the pylons 130 can be molded with any polymer suitable for the application, for example, a "NYLON", "PPS" or "PEEK" polymer. One precaution is that the processing temperature of the polymer should not exceed the melting temperature of the coil wire insulation unless protection is provided. Further, the polymer is often strengthened by including fibers composed of glass, carbon, and/or para-aramid in the injected pylon material, for example, "KEVLAR" para-aramid fiber commercially available from E.I. du Pont de Nemours and Company.

In use, a linearly-acting MR fluid damper, such as a strut 10, of FIG. 1 can be applied to a vehicle suspension system. The damping action of the strut 10 is changed by applying an electric current to the coil 84 that is representative of the desired damping effect between the sprung and unsprung masses of the vehicle. The electric current creates a magnetic field that sets the flow characteristics of the MR fluid in the flow gap 92, thereby providing the desired damping effect between the sprung and unsprung masses of the vehicle. The damper body tube 40 moves with respect to the piston assembly 28; and because of the efficient connection of the flux ring 90 to the piston assembly 28, the piston assembly 28 has no dead length beyond the functional length of the piston core 80. In other words, the pylons 130 eliminate the need for end plates or other apparatus otherwise required to secure the flux ring 90 to the piston core 80. Therefore, the full length of the piston assembly 28 is available, with the exception of the length of the coil 84, to provide a shear surface to achieve the desired damping action.

Thus, the piston assembly 28 of the present invention has several advantages. First, it eliminates the requirement of making expensive, high precision attachment components. Second, the part count of the piston assembly is reduced, and the piston assembly is easier to assemble, thereby reducing its cost. Third, a shorter piston assembly permits a more compact strut construction. Fourth, the pylons 130 may be selected from materials that provide other advantages to the piston assembly 28, such as a degree of flexibility to accommodate side load vibrations that may be imparted to the piston assembly.

While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. For example, the piston assembly described herein has application to other linearly-acting MR fluid dampers, for example, twin-tube struts and shock absorbers.

The invention in its broader aspects is, therefore, not limited to the specific details, representative apparatus and method, and illustrative examples shown and described. Accordingly, departures may be made from such details without departing from the spirit or scope of the general inventive concept.

Having described the invention, what is claimed is:

1. A piston assembly for use with a magneto-rheological ("MR") fluid damper comprising:
   a piston core having an outer surface;
   a flux ring having inner and outer surfaces substantially parallel to the outer surface of the piston core, the flux ring being positioned in a desired alignment with the piston core, such that the inner surface of the flux ring forms an annular flow gap with respect to the outer surface of the piston core;
   a plurality of projections extending across the flow gap intermediate the ends of the piston core and connecting the inner surface of the flux ring and the outer surface of the piston core for securing the flux ring in the desired alignment with the piston core.

2. A piston assembly for use with a magneto-rheological ("MR") fluid damper comprising:
   a piston core;
   a flux ring having inner and outer surfaces, the flux ring being positioned in a desired alignment with the piston core, such that the inner surface of the flux ring forms an annular flow gap with respect to the outer surface of the piston core, the flux ring further comprises a plurality of attachment passages disposed in, and spaced about, the outer surface of the flux ring, each attachment passage being in fluid communication with the flow gap and contiguous with a different one of the projections;
   a plurality of projections extending across the flow gap between the inner surface of the flux ring and the outer surface of the piston core for securing the flux ring in the desired alignment with the piston core.

3. The piston assembly of claim 2 wherein each of the plurality of attachment passages further comprises a hole intersecting the inner and outer surfaces of the flux ring.

4. The piston assembly of claim 3 wherein each of the plurality of attachment passages further comprises a plurality of holes, the plurality of holes arrayed in a pattern to form a low drag projection.

5. The piston assembly of claim 3 wherein each of the plurality of attachment passages further comprises a groove intersecting a respective hole.

6. The piston assembly of claim 5 wherein each of the plurality of attachment passages further comprises a plurality of holes intersecting the groove.

7. The piston assembly of claim 6 wherein each of the plurality of attachment passages further comprises a plurality of grooves, each of the plurality of grooves intersecting at least one of the plurality of holes.

8. The piston assembly of claim 2 wherein each of the projections comprises a polymer extending through a respective attachment passage.

9. The piston assembly of claim 8 wherein the polymer is reinforced with fibers selected from a group consisting of glass fiber, para-aramid fiber and carbon fiber.

10. The piston assembly of claim 2 further comprising a coil mounted on the piston core.

11. The piston assembly of claim 10 wherein the piston core has an annular recess in an outer surface and the coil is disposed in the annular recess.

12. The piston assembly of claim 2 wherein the desired alignment is a substantially concentric alignment of the flux ring with respect to the piston core.

13. A magneto-rheological ("MR") fluid damper comprising:
  a damper body tube having an inner surface and containing MR fluid;
  a piston assembly disposed in the damper body tube comprising
    a piston core having an outer surface,
    a flux ring having inner and outer surfaces substantially parallel to the outer surface of the piston core, the outer surface of the flux ring contacting the inner surface of the damper body tube, and the flux ring being positioned in a desired alignment with the piston core, such that the inner surface of the flux ring forms an annular flow gap with respect to the outer surface of the piston core, and
    a plurality of projections extending across the flow gap intermediate the ends of the piston core and connecting the inner surface of the flux ring and the outer surface of the piston core for securing the flux ring in the desired alignment with the piston core.

14. A magneto-rheological ("MR") fluid damper comprising:
  a damper body tube having an inner surface and containing MR fluid;
  a piston assembly disposed in the damper body tube comprising
    a piston core,
    a flux ring having inner and outer surfaces, the outer surface of the flux ring contacting the inner surface of the damper body tube, and the flux ring being positioned in a desired alignment with the piston core, such that the inner surface of the flux ring forms an annular flow gap with respect to the outer surface of the piston core, the flux ring further comprises a plurality of attachment passages disposed in, and spaced about, the outer surface of the flux ring, each attachment passage being in fluid communication with the flow gap and contiguous with a different one of the projections, and
    a plurality of projections extending across the flow gap between the inner surface of the flux ring and the outer surface of the piston core for securing the flux ring in the desired alignment with the piston core.

15. The MR fluid damper of claim 14 wherein the outer surface of the flux ring is in sealing contact with the inner surface of the damper body tube, such that the MR fluid does not leak therebetween in response to relative motion between the damper body tube and the flux ring.

16. The MR fluid damper of claim 14 further comprising a coil mounted on the piston core.

17. A method of making a piston assembly for use with a magneto-rheological ("MR") fluid damper comprising:
  fixing a piston core and a flux ring in a desired alignment forming a flow gap therebetween;
  injecting a polymer through each of a plurality of attachment passages in the flux ring to form the projections between the flux ring and the piston core; and
  forming a plurality of projections in the flow gap intermediate the ends of the flux ring and between the flux ring and the piston core to secure the flux ring to the piston core in the desired alignment.

18. The method of claim 17 further comprising injecting a polymer through each of a plurality of holes extending between inner and outer surfaces of the flux ring to form the projections between the flux ring and the piston core.

19. The method of claim 17 further comprising injection molding the projections using the plurality of holes in the flux ring.

* * * * *